R. H. ATCHESON.
METHOD OF AND APPARATUS FOR VULCANIZING.
APPLICATION FILED FEB. 16, 1921.

1,388,138.

Patented Aug. 16, 1921.
2 SHEETS—SHEET 1.

Inventor
Robert H. Atcheson

Howard E. Barlow
Attorney

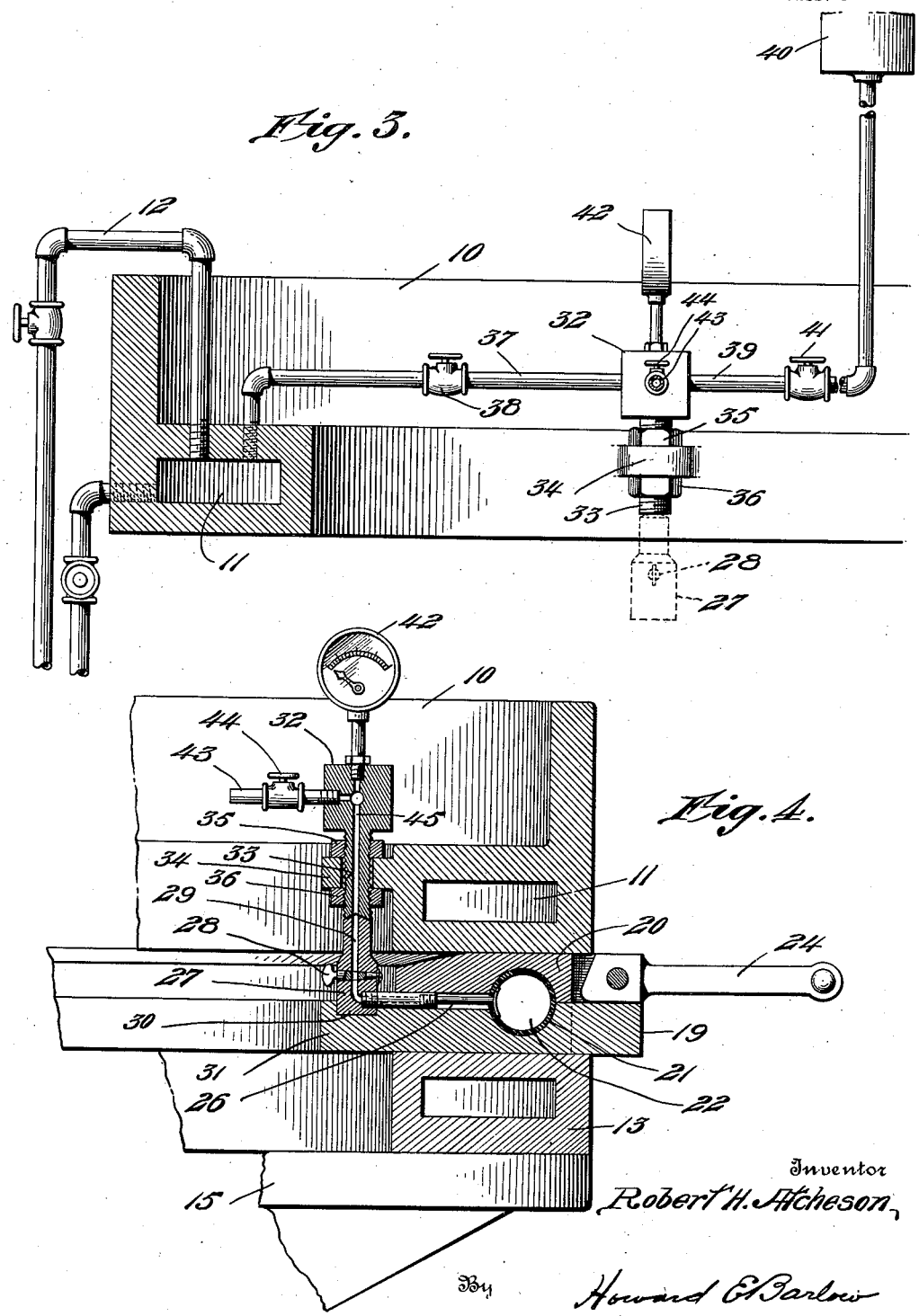

UNITED STATES PATENT OFFICE.

ROBERT H. ATCHESON, OF PROVIDENCE, RHODE ISLAND, ASSIGNOR TO IBEX RUBBER CORPORATION, OF JERSEY CITY, NEW JERSEY, A CORPORATION OF DELAWARE.

METHOD OF AND APPARATUS FOR VULCANIZING.

1,388,138.  Specification of Letters Patent.  Patented Aug. 16, 1921.

Application filed February 16, 1921. Serial No. 445,533.

*To all whom it may concern:*

Be it known that I, ROBERT H. ATCHESON, a citizen of the United States, residing at Providence, in the county of Providence and State of Rhode Island, have invented certain new and useful Improvements in Methods of and Apparatus for Vulcanizing, of which the following is a specification.

This invention relates to certain new and useful improvements in apparatus for and method of molding and vulcanizing hollow articles more particularly pneumatic tubes such as those used in tires for motor vehicles; and the object of this invention is to provide simple and effective means whereby such hollow articles, more particularly tubes of plastic or unvulcanized rubber or rubber compound, may be positioned in a mold and vulcanized without forcing the stock out through the joints of the mold.

It is found in practice in the use of a vulcanizing press of the present character that in vulcanizing rubber tubes of a size ordinarily used for pneumatic tires and which are usually constructed of rubber or rubber compound without a stiffening layer of fabric, that the area of the tube is so great that if a vulcanizing pressure of steam were admitted to first enter the tube while soft, that such a heavy pressure would produce two effects; first, its heat would tend to immediately soften the rubber; and second, the heavy pressure would have a tendency to open or spread the mold at the joint and force the softened material out through the joints thus destroying the tube.

To obviate this detrimental effect upon the tube I first admit a comparatively low pressure of air, preferably cold air into the tube for a short period which serves to first expand the tube in the mold and second, to cool the material and prevent it from melting or becoming softened until after the outer surface has been somewhat hardened by being partially cured, after which I may admit steam pressure into the tube of a temperature sufficient to complete the curing action.

With these and other objects in view, the invention consists of certain novel features of construction, as will be more fully described, and particularly pointed out in the appended claims.

In the accompanying drawings:

Fig. 3 is an enlarged view of a portion of the upper heating chamber sectioned on line 3—3 of Fig. 2, looking in the direction of the arrow.

Fig. 4 is an enlarged section on line 4—4 of Fig. 2, through the steam heating chambers, showing the same closed upon a mold, which latter is in operative position between them.

Figure 1:
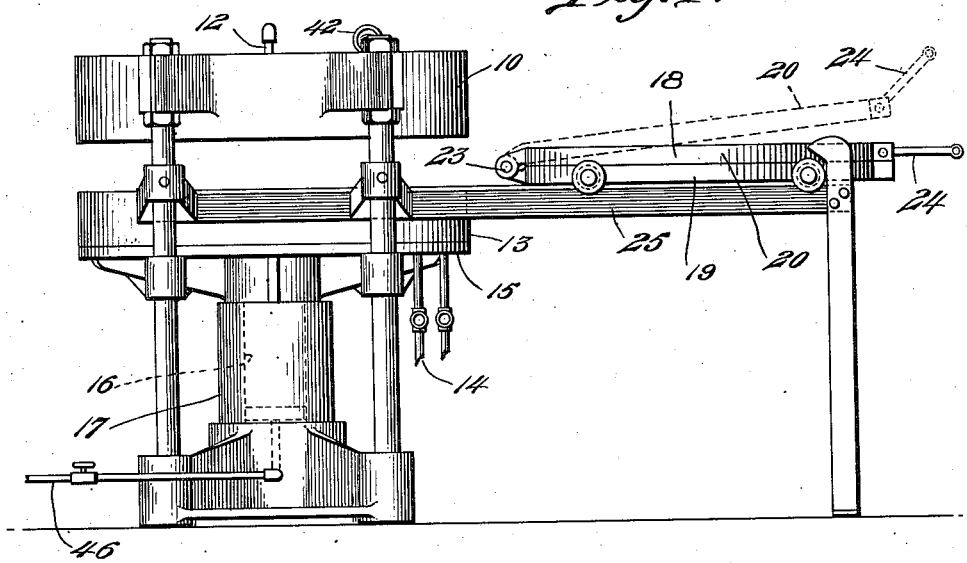
Figure 1 is a side elevation illustrating one form of apparatus by means of which a tube may be perfectly vulcanized.

As is well known in the art the usual method of forming pneumatic inner tubes for automobile tires, is to first make up the tubes in long lengths on a pole which lengths are wound with fabric and subsequently baked or vulcanized in an oven after which they are cut into the desired lengths, bent into ring form and their ends abutted or lapped and cemented together all without the use of a mold, which is a comparatively long and expensive operation and by which construction the abutting ends are not vulcanized and are therefore the weakest part of the tube.

In some other cases it is known that the smaller sizes of tubes such as bicycle tires and the like which contain a stiffening layer of fabric have been vulcanized in circular molds.

My present invention contemplates the constructing of tubes even the largest sizes employed in automobile tires by first taking an unvulcanized tube of rubber or rubber compound which is usually formed without a stiffening layer of fabric, cutting the same to the desired length, bending into ring form and abutting or lapping the ends to form a tire tube of the desired diameter and then inserting this tubular ring into a split circular mold and applying a vulcanizing heat thereto: And the following is a detailed description of one form of mechanism by which this result may be accomplished:—

With reference to the drawings, 10 designates the upper platen of the vulcanizing press in which is formed an annular chamber 11 which is supplied with steam at the necessary vulcanizing temperature or pressure through the supply pipe 12, and 13 designates the lower chamber member which is supplied with steam of the necessary vulcanizing temperature through the pipes 14.

This lower platen is shown as being mounted on a table 15 which latter is supported on a hydraulic piston 16 in the cylinder 17 whereby this lower chamber may be made to drop to permit the positioning of the mold member 18 between said upper and lower heating chambers.

This mold is preferably constructed of two registering ring members 19 and 20 which is provided between them with an annular recess 21 for the reception of the tube 22 to be vulcanized. These two ring members are shown as being hinged together at 23 and provided at their front edges with an operating handle member 24 by which this mold may be drawn out upon tracks 25 upon which it is deposited when the lower platen is dropped and this handle is also adapted to raise the upper half of the mold and swing it up upon its hinge 23 to permit the ready placing of the tube therein to be vulcanized and its removal therefrom after having been submitted to a vulcanizing action.

Before the tube is inserted into the mold I preferably fix the usual hollow stem 26 into the tube and I connect to this stem a valve member 27 which is provided with a passageway 29 and a shut off valve 28, the lower end of which member may be seated and supported at 30 on the inwardly projecting portion 31 of the lower mold ring 19.

In order to admit pressure of either air or steam into the tube after having been positioned in the mold and the mold positioned between its upper and lower heating chambers 10 and 13, I have constructed a five-way channel head member 32 which is provided with a threaded stem 33 projecting through the annular hole in the boss 34 formed on the inner surface of the upper platen 10 and in which this head member receives vertical adjustment by setting the upper and lower binding nuts 35 and 36.

To one side of this head is connected the steam pipe 37 which leads from the upper steam chamber 11 through the valve 38. To the other side of the head is connected the air-feed pipe 39 leading from the pressure tank 40 through the valve 41. To the upper end of this head is connected the pressure indicator 42 to indicate the pressure in the tube and to the rear of the head is connected the discharge pipe 43 controlled by the valve 44 all of which openings communicate with the central passageway 45 through the stem which communicates with the passageway 29 in the valve member 27 when the mold is in operative position.

Figure 2:
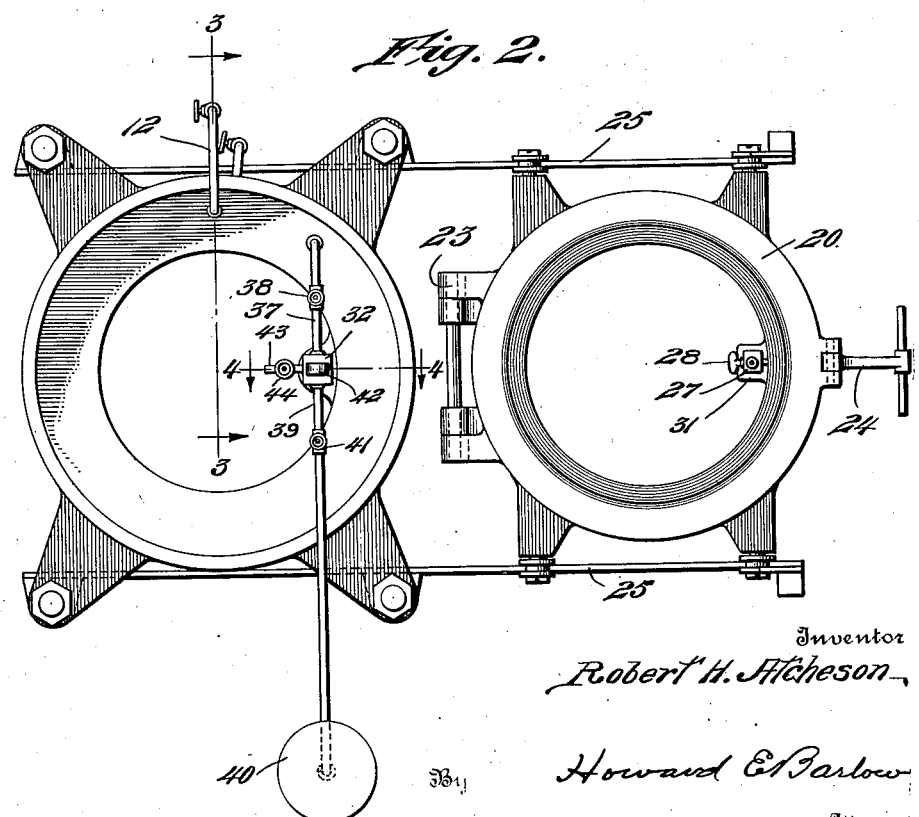
Fig. 2 is a plan view of the mechanism illustrated in Fig. 1.

In operating the apparatus I first deposit into the mold an unvulcanized tube which has been previously made up into ring form and slightly inflated, the mold having been previously drawn from the heating chambers 10 and 13 into the position illustrated in Figs. 1 and 2. I next return the mold between these chambers and admit hydraulic pressure through the feed pipe 46 to the ram or piston 16 thus raising the lower chamber and forcing the mold up against the upper chamber 10 which at the same time automatically completes the connection between the valve member 27 and the five-way pressure-supply head 32. I next open valve 41 and admit a comparatively light pressure, say thirty pounds, more or less, preferably of cold air from the tank 40 into the tube to expand the same against the walls of the mold, which cool air prevents the tube from melting or softening and so prevents it from being blown out through the joint in the mold.

In the meantime the highly steam heated chambers 11 and 13 are heating the tube through the walls of the mold and so producing a partial vulcanizing effect upon its outer surface.

It has been found in practice that if the full pressure of steam were first admitted to this tube before its outer surface had been partially vulcanized, that this heavy pressure admitted to so large an area would spring the members of the mold apart and open the joints between them and as the heat due to such a pressure would soften or melt the rubber compound the pressure would force this softened material out through the joint and so completely destroy the tube; but it has been found in practice that by first admitting a comparatively low pressure of cool air into the tube and permitting this low pressure to simply expand the tube in its mold and hold it firmly out against the heated rings for a short time or until the outer surface can be partially cured or hardened the tube will then stand the full pressure of steam which is necessary for vulcanizing the same on its inner surface and so complete the curing action. After the tube has been subjected to the vulcanizing heat for a predetermined period I close valve 41 and shut off the pressure of air which is retained in the tube. I then open valve 38 admit the full steam pressure of 100 pounds, more or less, from the chamber 11 directly into the tube to mix with the air therein contained, which serves to cure the inner surface and complete the proper vulcanizing of the tube, the whole operation requiring but a few minutes.

After the time for vulcanizing has expired it is only necessary to close valve 38 and open valve 44 permitting the pressure to escape after which the lower platen is dropped the mold drawn out from the press and opened, and the tube removed in a finished condition, the apparatus then being ready to repeat the operation upon another tube.

I have shown and described an arrangement by which steam may be admitted from the upper steam chamber into the tube, but steam may be conducted from any suitable source to the tube.

In some instances it may be found desirable to admit a low pressure of steam to the tube in the first instance, instead of primarily admitting a pressure of air and in which former case it is only necessary to open valve 38 slightly or sufficiently to admit just steam enough to properly inflate the tube in the mold and the pressure admitted may be visibly determined by the gage 42. After the tube has been partially vulcanized and hardened somewhat on the outside, the full pressure may then be admitted by fully opening the control valve to complete the vulcanizing of the tire on its inside.

Having thus described one illustrative embodiment of my invention and the best mode known to me for carrying out my method, I desire it to be understood that although specific terms are employed, they are used in a generic and descriptive sense and not for the purpose of limitation, the scope of the invention being defined and limited only by the terms of the appended claims.

I claim:

1. A tube vulcanizer comprising a mold for the tube having a single communicating opening thereinto, means for heating the mold, a single hollow stem extending through said opening and communicating with said tube therein, means for communicating with an air supply and connected to said stem for admitting air pressure into said tube to expand the same in said mold, and means communicating with a steam supply also connected to said stem, whereby a vulcanizing pressure of steam may also be subsequently admitted to the confined air in the tube through said stem to vulcanize the interior of said tube.

2. An improved method of vulcanizing a tube which consists in placing the tube in a mold applying a vulcanizing heat to the mold, admitting a pressure of air into the tube to expand it in the mold and subsequently admitting a curing pressure of steam into the tube without exhausting the air therefrom.

3. An improved method of vulcanizing a compounded rubber tube which consists in making the tube into ring form, placing the tube in a mold, applying a vulcanizing heat to the mold, admitting a comparatively light pressure of air into the tube for a predetermined period to expand the tube in said mold, subsequently shutting off said air pressure and admitting a curing pressure of steam into the tube without exhausting the air therein contained.

4. An improved method of vulcanizing a compounded rubber tube, which consists in placing the tube in a mold, positioning the mold between steam heated chambers admitting an expanding pressure of cold air into the tube while the exterior of the tube is being partially cured and subsequently shutting off the air supply and admitting vulcanizing steam from one of said chambers to the interior of the tube without exhausting the air in the tube to complete the curing of the tube internally.

5. An improved method of vulcanizing a tube which consists in making the tube into ring shape and placing the same in a similarly shaped mold, applying a vulcanizing heat to the mold, admitting a comparatively low pressure of cold air into the tube to expand it in the mold and subsequently shutting off the air supply and admitting a curing pressure of steam into the tube with the air therein contained.

6. A vulcanizer comprising two heating members, a mold for a ring-shaped tube removably mounted between said members, a pressure supply pipe, means for automatically connecting said supply pipe into said tube through said mold when both the latter and said members are in operative position, and means for controlling the pressure to enter the tube in the mold.

7. A vulcanizer comprising two ring-shaped heating members, means for moving one of said members relative to the other, a ring-shaped tube-receiving mold removably mounted between said heating members, means for connecting the pressure supply permanently to one of said members, means for automatically connecting the pressure supply to the mold with that of the fixed member when said members are closed upon the mold, and a valve for controlling the pressure to enter the tube in said mold.

8. A vulcanizer comprising two ring-shaped heating members, means for moving one of said members relative to the other, a ring-shaped tube-receiving mold removably mounted between said heating members, means for connecting the presure supply to the mold with that of the fixed member when said members are closed upon the mold, a valve for controlling the pressure to enter the tube in said mold, and a gage by which the pressure in the tube may be determined.

In testimony whereof I affix my signature.

ROBERT H. ATCHESON.